United States Patent [19]

Troadec

[11] Patent Number: 5,654,103
[45] Date of Patent: Aug. 5, 1997

[54] PROCESS FOR THE MANUFACTURE OF A BIODEGRADABLE, HYDROPHOBIC AND TRANSPARENT FILM AND FILM THUS OBTAINED

[75] Inventor: Jean-René Troadec, Tregunc, France

[73] Assignee: C.R.E.C.A., Quimper, France

[21] Appl. No.: 553,695

[22] PCT Filed: Jun. 2, 1994

[86] PCT No.: PCT/FR94/00647

§ 371 Date: Dec. 1, 1995

§ 102(e) Date: Dec. 1, 1995

[87] PCT Pub. No.: WO94/29382

PCT Pub. Date: Dec. 22, 1994

[30] Foreign Application Priority Data

Jun. 4, 1993 [FR] France .................... 93 06963

[51] Int. Cl.⁶ .................................................... B32B 9/04
[52] U.S. Cl. ................... 428/411.1; 427/366; 427/374.1; 427/384; 427/398.1; 427/421; 427/430.1; 427/541; 427/553
[58] Field of Search .................. 427/553, 366, 427/430.1, 421, 398.1, 374.1, 384, 541; 428/411.1

*Primary Examiner*—Bernard Pianalto

[57] ABSTRACT

Process for the manufacture of a biodegradable hydrophobic and transparent film, comprising the following steps:

(a) producing a mixture including an alginate of algal origin the algae being chosen from the group consisting of, chlorophyceae, rhodophyceae, or phaeophyceae, or a synthetic equivalents thereof an aqueous solvent and a plasticizer which is miscible with the alqinate and the solvent;

(b) forming a film from this mixture;

(c) drying the film thus obtained;

(d) treating at least one face of the dry film with a solution of tanning material selected from the group consisting of an alum, a tannin or a chrome tanning solution and then with a solution of a compound capable of ensuring the gelling of the alginate, said compound being chosen from the group consisting of calcium carbonate, calcium or zinc chloride, calcium or zinc sulfate.

12 Claims, 2 Drawing Sheets

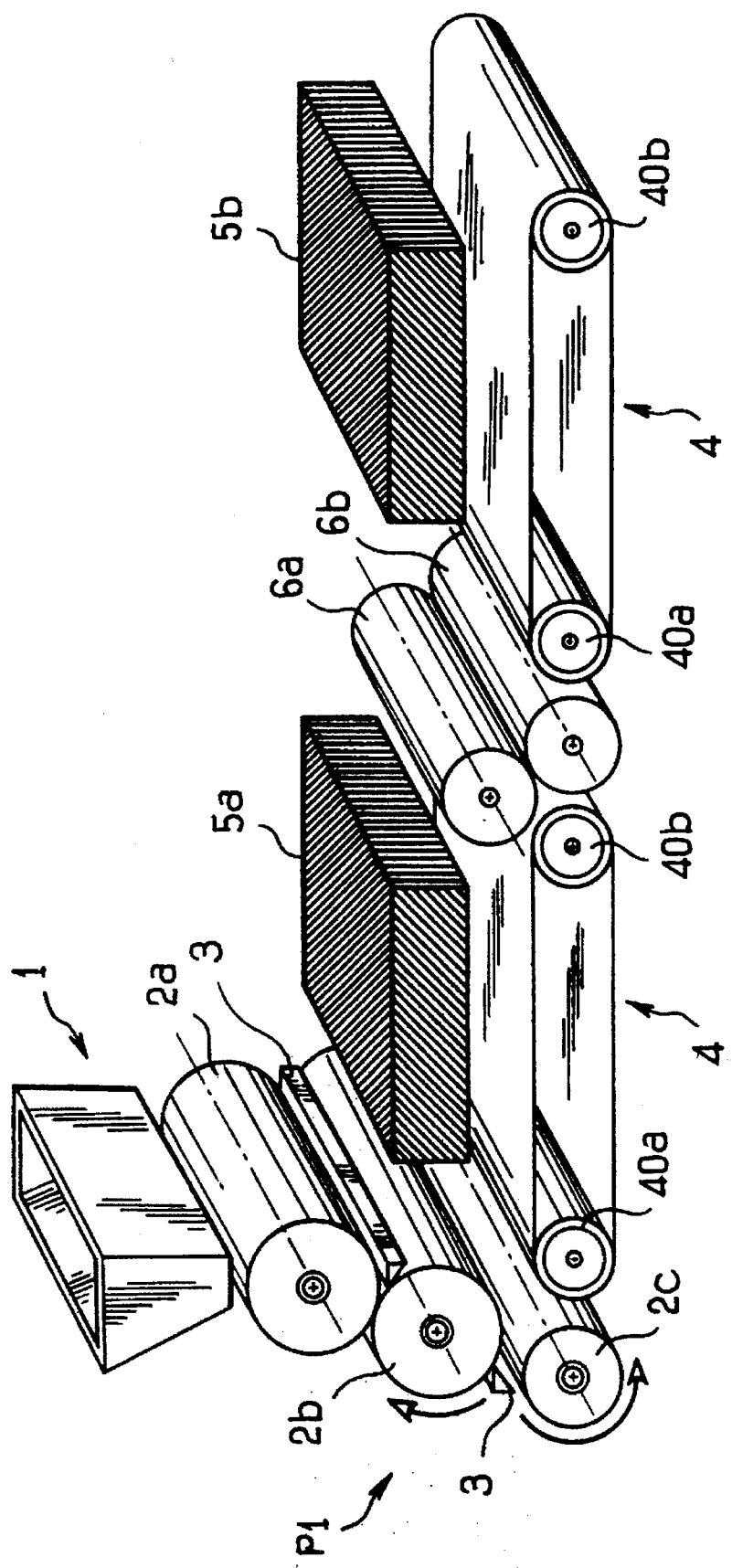
FIG_1

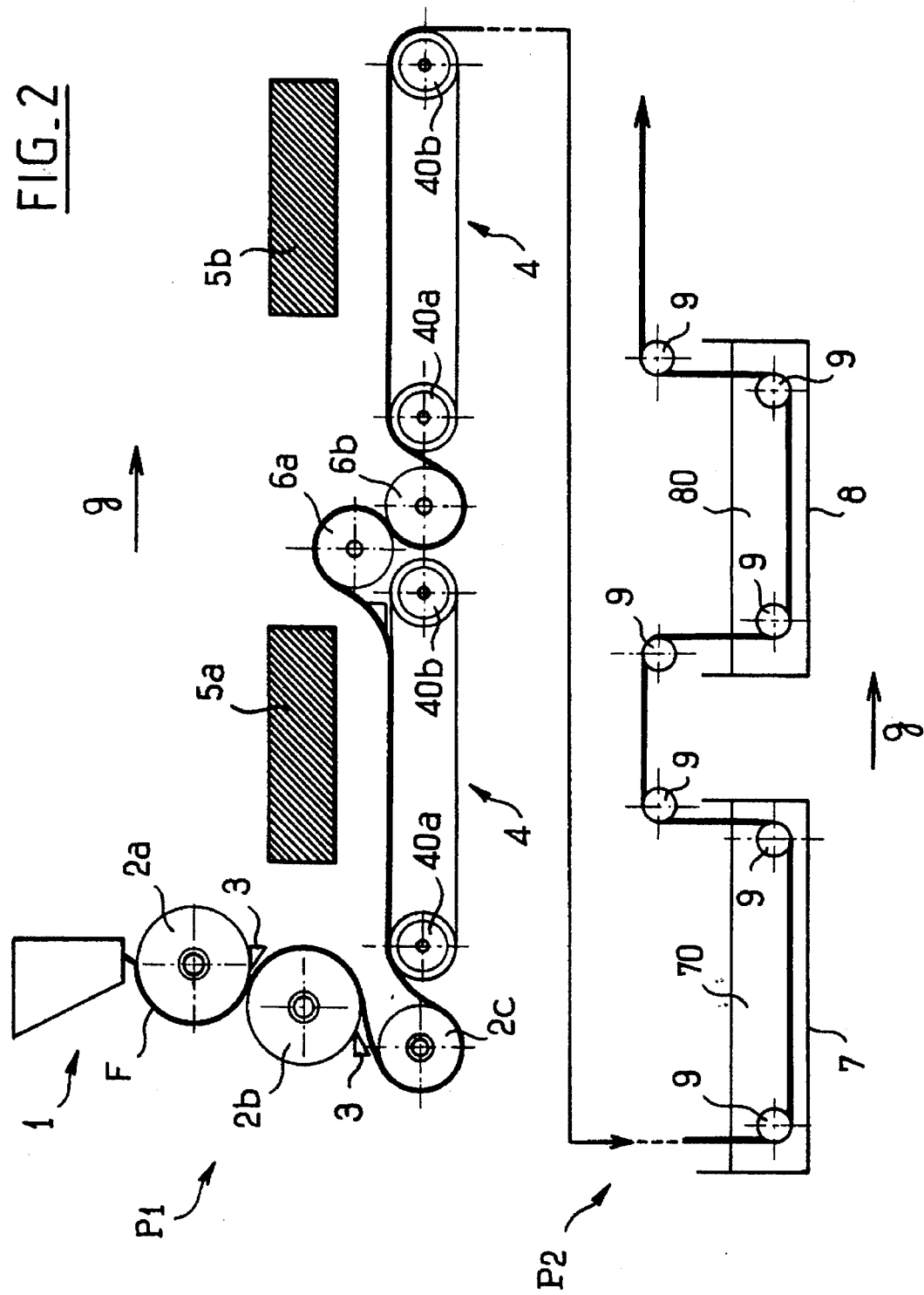

PROCESS FOR THE MANUFACTURE OF A BIODEGRADABLE, HYDROPHOBIC AND TRANSPARENT FILM AND FILM THUS OBTAINED

The present invention relates to a process for the manufacture of a biodegradable, hydrophobic and transparent film.

It also relates to the film obtained by such a process.

Throughout the present application "hydrophobic" will be intended to mean the capacity of the film to be neither wetted nor penetrated by water.

A very great proportion of the films employed at the present time, especially constituting packaging, is made up of synthetic plastics. This trend follows from the low cost and great industrial adaptability of these materials, and from the varied number of forms in which they can be used.

Among them, those most frequently employed are polyethylene, polyester and polyvinyl chloride.

The industrialized countries, in particular for reasons which have to do with ecology, tend to reduce the use of these plastics, especially for packaging. It is well known, in fact, that these materials have a very low or nil degradability. Because of this, they constitute a source of considerable pollution.

It has, of course, been proposed to modify the synthetic polymers employed as packaging, for example by modifying their structure or by coupling them with other molecules, to make them sensitive to the natural degradation process. However, the materials obtained degrade only very partially, and this appears to be insufficient, bearing in mind the enormous quantities of packaging which are employed.

The awakening of the consumers' awareness of ecological problems has led them to turn their back on plastic packaging and films in favor of those consisting of products of natural origin and/or which are easily degraded. Unfortunately, these products do not offer the same mechanical and physical characteristics as plastics. This is especially the case with paper and cardboard.

One objective of the present invention is to propose a process for the manufacture of a film which is biodegradable but also perfectly transparent and hydrophobic, that is to say insensitive to the moisture liable to come into contact with it.

Such a film can be employed as a material for packaging or closures while being inert, at least in the medium term, towards products which are destined to come into contact with it, especially when the latter are of an alimentary type.

Another objective is to propose a process for the manufacture which is both simple and economical.

These objectives are attained, in accordance with the invention, by the fact that this process consists in carrying out the following stages:

a) producing a mixture consisting of a hydrocolloid, an aqueous solvent and a plasticizer which is miscible with the hydrocolloid and the solvent;

b) forming a film from this mixture;

c) drying the film thus obtained;

d) treating at least one face of the dry film with a solution of tanning material and then with a solution of a compound capable of ensuring the gelling of the hydrocolloid.

The hydrocolloid is preferably an alginate, a hydrocolloid with which the Applicant Company's research and trials have been more particularly concerned.

The Applicant Company has found that when a film is produced in accordance with this operating method, the latter is not only biodegradable but also hydrophobic and perfectly transparent.

The action of the tanning material can be analyzed both as a tanning and mordanting of the film, namely:

a tanning which makes it possible to coagulate the surface of the alginate film;

a mordanting by attacking the surface of the film to prepare the action of the compound capable of ensuring the gelling of the alginate.

According to other advantageous characteristics of this process:

in stage d) the treatment of the film is performed by immersion, coating or spraying;

the solvent consists of a mixture of water and of a $C_1$-$C_6$ aliphatic monoalcohol;

the plasticizer is chosen from the group made up of polyols such as glycerol, polyethylene glycol and sorbitol;

the tanning material consists of an alum, a tannin or a chrome tanning solution;

the alum is a potassium alum;

the compound capable of ensuring the gelling of the alginate is chosen from the group made up of:
potassium or sodium nitrates,
calcium carbonate,
calcium, potassium, magnesium or zinc chlorides,
calcium, potassium, magnesium or zinc sulfates;

the mixture from stage a) includes (% by weight):
2 to 6% of alginate;
10 to 50% of plasticizer, expressed in relation to the quantity of alginate;

at the end of stage a) the mixture is dehydrated and then rehydrated with a quantity of solvent which is smaller than the initial quantity;

the dehydration is carried out by freeze-drying the mixture;

the drying of the film is carried out by passing the latter over a series of rotary heating rollers followed by treatment with microwaves;

the treatment with microwaves is performed by passing the film under a number of modules of advantageously adjustable power;

the mixture from stage a) additionally includes additives such as antioxidants, anti-UV additives, stabilizers and colorants.

The invention also relates to the film obtained by carrying out this process.

Other characteristics and advantages of the invention will appear on reading the detailed description which is to follow, given with reference to the attached drawings, in which:

BRIEF DESCRIPTION OF THE DRAWINGS

FIG. 1 is a simplified view in perspective of a part of a plant for the manufacture of a film according to the process in accordance with the invention;

FIG. 2 is a diagram showing the whole of this plant, in side view.

Throughout the present application "plasticizer" will be intended to mean a material capable of reducing the macromolecular interactions of the alginate—or other hydrocolloid—by being inserted between the chains of the latter. The purpose of this plasticizer, when the film is produced, is to make it more plastic and, consequently, more moldable and deformable.

Furthermore, the expression "compound capable of ensuring the gelling of the hydrocolloid" will be intended to mean a compound which makes it possible to generate within the hydrocolloid zones which are highly structured and crosslinked, of the egg-box type ("egg box model").

Hydrocolloids which can be employed within the scope of the invention are, among others, hydrocolloids, and in particular alginates, of algal origin. The algae are preferably chosen from the families consisting of the chlorophyceae, the rhodophyceae and the phaeophyceae. Both marine algae and freshwater algae can be employed. Famed, drifting or washed-up algae are also suitable.

Other alginates may, however, be employed within the scope of the invention, for example synthetic alginates.

The alginate is preferably in its sodium form or in the form of a salt of another alkali- or alkaline-earth metal.

The purpose of the solvent, of course, is to make it possible for the hydrocolloid to dissolve. It is an aqueous solvent.

This solvent preferably consists of a mixture of water and of an aliphatic monoalcohol, especially ethanol.

The plasticizer which is miscible with the solvent and the alginate is preferably chosen from the group made up of polyols such as glycerol, polyethylene glycol and sorbitol.

Its function is to modify the cohesion characteristics of the film by weakening the macromolecular interactions with the alginate, that is to say by being inserted into the chains of which it consists.

The plasticizer must have good compatibility with the hydrocolloid/solvent pair in order to avoid phase separation when the film is being dried. It is therefore appropriate to employ a hydrophilic plasticizer in order to plasticize this film based on a hydrophilic polymer. The polyols, and more particularly glycerol and sorbitol, are particularly employed in the formulation of films based on hydrocolloids because of their dual compatibility with the aqueous solvents employed and with the polysaccharides.

The addition of plasticizer therefore has the effect of decreasing the cohesion and the strength of the network and therefore of making the film more flexible, stretchable and less brittle.

On the other hand, the presence of plasticizer increases the permeability of the film to the transfer of water vapor and of gases in general, because it confers greater mobility on the gas molecules in the film.

The treatment of an alginate film with a tanning material is already known per se in order to make the film insoluble in water.

Furthermore, as already stated above, the compound capable of ensuring the gelling of the alginate makes it possible to generate within the alginate zones which are highly structured and crosslinked, which also make the alginate insoluble in water.

However, by subjecting, in accordance with the invention, an alginate-based dry film to a solution of tanning material and then to a solution of a compound ensuring the gelling of the alginate, a synergism between these two treatments takes place, which is reflected not only in the fact that the film is insoluble in water, but also in the fact that it becomes hydrophobic. In other words, its appearance and its weight remain unchanged in contact with water.

The treatment of only one of the two film faces with the above compounds may be of advantage, in particular in the following situation.

It is well known that deep-frozen alimentary products are sometimes subjected to some temperature variations which are reflected in the appearance of microcrystals of ice on the surface of the product. This phenomenon, called a "snow effect" is disadvantageous, in particular, where visual appearance and taste are concerned.

If this alimentary product is packaged in a bag made of a film in accordance with the invention, with the hydrophobic side facing toward the outside, the microcrystals will be capable of being absorbed by the internal side, not subjected to this treatment, with the result that the "snow effect" will be diminished, or even eliminated.

These characteristics will be demonstrated in the continuation of the description.

EXAMPLE 1

Production of alginate-based mixtures.

The following compounds are mixed, with a rotary stirrer carrying propellers, a mixer or a centrifuge of known type: 810 ml of water, 150 ml of ethanol, 25 g of alginate (in sodium form) and 15 g of glycerol.

This mixture $M_1$ is converted into film form by rolling on a glass sheet with a side of 30 cm.

It is allowed to dry for 12 hours at 60° C. and a film $F_1$ is obtained.

940 ml of water, 40 g of alginate (in calcium form) and 20 g of glycerol are mixed in the same way as above.

After converting this mixture $M_2$ into film form, drying is allowed to take place for 12 hours at 60° C. and a film $F_2$ is obtained.

EXAMPLE 2

Behavior of the films in water 1.5-g samples are taken from each of the films $F_1$ and $F_2$.

The nature of the treatments to which these films $F_1$ and $F_2$ have been subjected are given in the table below together with their characteristics and behavior after being placed for 2 hours in distilled water.

The terms employed in this table have the following meaning:

$CaCl_2$=solution of calcium chloride.

alum=solution of potassium alum $(Al_2(SO_4)_3 \cdot K_2SO_4 \cdot 24H_2O)$.

The treatments of the films with these two products were performed by dipping in the corresponding solutions for a period of between 30 seconds and one minute (fast crosslinking).

The duration of the contact of the film with the solutions of $CaCl_2$ and of alum is not critical. It may vary from a few seconds to several minutes.

The expression "$CaCl_2$ before drying" means that the film $F_1$ or $F_2$ was treated before being dried for 12 hours at 60° C., that is to say that a film which was still moist was treated.

The data which appear in the following table express the results obtained in a series of trials conducted with $CaCl_2$ and alum concentrations of 5, 10, 15 and 20% by weight.

| FILM | NATURE OF THE TREATMENT | CHANGE IN WEIGHT | FINAL APPEARANCE OF THE FILM |
|---|---|---|---|
| $F_1$ | none | | dilution in water in 30 s |
| $F_2$ | none | | dilution in water in 30 s |
| $F_1$ | $CaCl_2$ before drying | +11.5 g | swells transparent |

-continued

| FILM | NATURE OF THE TREATMENT | CHANGE IN WEIGHT | FINAL APPEARANCE OF THE FILM |
|---|---|---|---|
| $F_2$ | $CaCl_2$ before drying | +50.5 g | swells transparent |
| $F_1$ | $CaCl_2$ before drying alum in dipping | 0 | translucent |
| $F_2$ | $CaCl_2$ before drying alum in dipping | 0 | translucent |
| $F_1$ | alum in dipping | 0 | translucent breaks very easily |
| $F_2$ | alum in dipping | 0 | translucent breaks very easily |
| $F_1$ | $CaCl_2$ in dipping | 0 | translucent breaks very easily |
| $F_2$ | $CaCl_2$ in dipping | 0 | translucent breaks very easily |
| $F_1$ | $CaCl_2$ in dipping then alum in dipping | 0 | opaque |
| $F_2$ | $CaCl_2$ in dipping then alum in dipping | 0 | translucent |
| $F_1$ | alum in dipping then $CaCl_2$ in dipping | 0 | transparent hydrophobic |
| $F_2$ | alum in dipping then $CaCl_2$ in dippng | 0 | transparent hydrophobic |
| $F_1$ | alum before drying | +13.5 g | swells opaque |
| $F_2$ | alum before drying | +26.5 g | swells opaque |
| $F_1$ | alum before drying $CaCl_2$ in dipping | 0 | formation of bubbles |
| $F_2$ | alum before drying $CaCl_2$ in dipping | 0 | formation of bubbles |
| $F_2$ | alum + $CaCl_2$ mixture in dipping | 0 | formation of bubbles |

These results show that only a treatment on dry film with alum and then with calcium chloride allows a transparent and hydrophobic film to be obtained.

It will be noted that in the above examples the films were allowed to dry 12 hours at 60° C. before they were treated with potassium alum and calcium chloride.

It is possible, of course, to resort to other drying methods and techniques, especially with a view to an industrial production of the film.

FIGS. 1 and 2, which are attached, show diagrammatically a plant for the manufacture of film which includes both drying means and means for treatment with the abovementioned two products.

The "drying station" part of this plant can be seen in FIG. 1 and the upper part of FIG. 2, while the lower part of this second figure shows the station for treatment with potassium alum and calcium chloride.

The drying station $P_1$ comprises a hopper 1 for storage and distribution of a known type of the mixture intended to form the film. Its open lower end is situated vertically in line with a series of three heating rotary rolls 2a, 2b, 2c, whose directions of rotation are opposite in pairs.

The bottom of the hopper has an outlet slit for the mixture, parallel to the generatrices of the rolls and the width of which is preferably adjustable; the mixture flows in the form of a layer, by gravity, through this slit onto the upper roll 2a the speed of which is chosen so as to harmonize with the flow rate. It is therefore a film of material that is formed on the roll 2a, in order to be subsequently transferred onto the following rolls.

Brush scrapers 3 control the thickness and promote the transfer of the film to the following roll.

Near the lower roll 2c an endless conveyor belt 4 is placed, whose driving rollers are referenced 40a and 40b. They convey the film leaving the roll 2c.

Between this conveyor and a second one of the same type, also referenced 4, rotary transfer rolls 6a, 6b are provided. The conveyor belts 4 are advantageously made of carbon-treated P.T.F.E. (polytetrafluoroethylene).

Above the upper section of the two conveyors 4, microwave generators 5a, 5b with radiating slits directed towards these conveyors are provided. Their function will be explained later.

Downstream of the conveyors (lower part of FIG. 2) the treatment station $P_2$ is provided, which comprises two troughs 7 and 8 containing a solution 70 of potassium alum and a solution 80 of calcium chloride respectively. Each of these troughs is provided with rotary return rollers 9.

It should be noted that the means for driving the rollers and rolls of this plant, preferably at variable speed, have not been shown in order not to burden the figures unnecessarily. They are, for example, electrical motors of a known type.

In FIG. 2 the direction of forward travel of the film F has been shown using the arrow g.

The purpose of passing the film over the rolls 2a, 2b, 2c is to partly rid it of the water which it contains. This partial removal of water takes place essentially at the surface, by successive contacts of the two faces of the film on the rolls 2a, 2b and 2c. The temperature and the speed of rotation of these rolls are chosen to allow approximately 60% of the wager to be evaporated without creating bubbles (microparticles of water) in the film, which impair the transparency and visual quality and which would appear in the event of excessively abrupt removal of this water.

Passing under the two successive microwave generators 5a, 5b makes it possible to remove the water situated deep within the film. Here again, the power of these generators will have to be determined so as to bring about a gentle removal of this water, without creating bubbling within the film. If necessary, it is quite possible to pass the film under a greater number of generators, each being of low power, decreasing from upstream toward downstream if the wish is to obtain a flexible film while limiting the sublimation of the water trapped within the film.

On leaving the generators, the film F is moved by means of the rollers 9 into the troughs 7 and 8. In an alternative form of embodiment these troughs could be replaced by means for spraying or coating one or both faces of the film with the corresponding solutions.

The operating conditions which make it possible to obtain a perfectly transparent and bubble-free film will be found below.

80 kilograms of film-forming solution are prepared from the following components in a 100-liter tank:

water+ethanol=76.8 l alginate=2 kg glycerol=1.2 kg

To obtain the mixture, 12 liters of ethanol at a concentration of 9.9% are poured into a volume of 64.8 liters of demineralized water. The mixture is heated to 40° C. and 2 kilograms of sodium alginate and 1.2 kilograms of glycerol are incorporated therein while mixing the whole.

A mass of 80 kilograms of alginic gum is thus obtained, which is introduced into the hopper 1. The outlet nozzle (or slot) of the latter has a length of 300 mm—corresponding to the width of the web to be produced, and its width—corresponding to the thickness of the web—is adjusted to 2.5 mm.

Adjustments of the speed of travel and of the "crystallization" temperatures are then made as a function of the specific properties sought after.

The film-forming mixture deposited on the upper roll 2a therefore has a thickness of 2.5 mm.

This roll is, for example, at a temperature of 40° C. A distribution of warm pulsed air, at 30° C., is advantageously provided on this roll 2a, and this produces a surface crusting.

The rolls 2b and 2c are at the temperature of 45° C. and 30° C. respectively.

The time of travel of the film between the rolls 2a and 2c is 1 minute.

Brush scrapers advantageously control the thickness uniformity of the film.

It is a film which is "crystallized", that is to say solidified on both faces (internal and external) which is taken up by the conveyor 4.

When the film passes under the microwave generators 5a, 5b with radiating windows, evaporation of the free water trapped in the film and thorough drying without excessive evaporation take place. Each generator 5a, 5b has a power of 2×400 watts. More than two successive generators could, moreover, be used.

The total time of travel of the film under the generators 5a, 5b is of the order of 4 minutes.

The film-forming band is next treated at the station $P_2$ where the treatments with the liquid solutions of potassium alum and calcium chloride are carried out by dipping in the successive troughs 7, 8, and this produces the tanning and the gelling of the film.

A station for final drying of the treated film may be provided at the exit from the trough 8.

The film obtained is, for example, converted into reel form or employed for manufacturing a multilayer film by hot adhesive bonding according to techniques which are known to a person skilled in the art.

In order to reduce the duration of drying of the film it is possible to dehydrate the starting mixture and then to rehydrate it with a lower water content.

The advantage of such a process is that it shortens the duration of final drying of the film. The dehydration will rid the mixture of its "free" solvent, that is to say solvent which is not associated with the molecules of hydrocolloids. It then suffices to rehydrate the mixture with solvent, in a proportion of 20 to 30% by weight of the mixture, to enable a film to be produced. The film is then manufactured as previously and then dried and treated, for example as mentioned with reference to FIGS. 1 and 2.

The dehydration of the mixture may be performed by any technique which is known to a person skilled in the art. An advantageous solution is the dehydration by freeze-drying.

In all the examples hereinafter, the films employed were treated with a solution of potassium alum at a concentration of 10% by weight and a solution of $CaCl_2$ at a concentration of 10% by weight.

EXAMPLE 3

Measurement of permeability to water vapor and to oxygen.

Measurements of permeability of a film $F_1$ of 100 µm thickness were performed. They gave the following results:

permeability to water vapor at 24° C. (under 760 mm Hg)=1.44 g/m²/mm thickness/hour;
permeability to water vapor at 38.5° C. (under 760 mm Hg)=1.18 g/m²/mm thickness/hour;
permeability to oxygen=45 cm³/m²/mm thickness/hour.
These measurements were made by the usual methods:
gravimetry in the case of water vapor and gas phase chromatography in the case of oxygen.

EXAMPLE 4

Behavior of the film in contact with various chemical agents.

The study of the behavior of a film $F_1$, of 100 µm thickness, treated with alum and calcium chloride, obtained from the mixture M1, in contact with various chemical agents, was carried out.

The results appear in the following tables

| | Behavior toward acids (% loss in weight) | | | | | | | |
|---|---|---|---|---|---|---|---|---|
| | Hydrochloric acid | | Sulfuric acid | | Nitric acid | | Acetic acid | |
| Nature/Concentration | 0.1N | 1N | 0.1N | 1N | 0.1N | 1N | 0.1N | 1N |
| Duration of exposure | | | | | | | | |
| 1 hour | 30 | 31 | 40 | 23 | 29 | 27 | 27 | 22 |
| 2 hours | 39 | 28 | 35 | 15 | 36 | 24 | 10 | 31 |
| 4 hours | 36 | 38 | 43 | 26 | 47 | 40 | 24 | 35 |

| | Behavior toward bases and oils (% loss in weight) | | | | | | |
|---|---|---|---|---|---|---|---|
| Nature/ | Sodium hydroxide | | Aqueous ammonia | | Mineral | Liquid paraffin | Vegetable |
| Concentration | 0.1N | 1N | 0.1N | 1N | oil | | oil |
| Duration of exposure | | | | | | | |
| 1 hour | 30 | 8 | 21 | 3.3* | 4.7 | 7.1 | 8.3 |
| 2 hours | 8.7* | 17.8* | 17 | 37 | 1.9* | 0.60* | 17* |
| 4 hours | 38 | 7 | 17 | 30 | 15 | 13* | 1.5* |

(*): the values marked with an asterisk correspond to a gain (and not a loss) in weight.

Although these results are incommensurable with those obtained with films made up of synthetic polymers, the film of the invention, in contact with these products, retains its cohesion, that is to say it does not degrade, in contrast to films produced with other natural polymers.

EXAMPLE 5

Test for biodegradability

A trial of biodegradability is performed on a sheet of film $F_1$, obtained by thermoforming, 400 micrometers in thickness and 40 cm² in area.

To do this, various materials corresponding to the different layers of terrain sheltering a dump for burying household wastes are placed in a microperforated plastic tube.

The operating conditions are the following:
diameter of the tube=100 mm,
height of the tube=300 mm,
nature of the materials and thickness, beginning with the bottom of the tube:
gravel=30 mm,
mine sand=37.5 mm,
clay=22.5 mm,
bottom soil=67.5 mm,
ground household wastes=67.5 mm,
fill covering=45 mm,
arable earth=30 mm.

The film is dispersed within the ground household wastes in the form of 40 1-cm² fragments.

After 6 months' burial, only 17 fragments have been recovered, the area of which is between 0.8 cm² and 0.07 cm².

This test shows the highly biodegradable nature of the film obtained in accordance with the process of the invention.

EXAMPLE 6

Test for incineration

The combustion of 100 g of a film $F_1$ is carried out until a constant weight of ash is obtained.

The residual weight of ash is then 0.6 g, the latter showing no trace of polluting waste.

Additives such as antioxidants, anti-UV additives, stabilizers and colorants may, of course, be incorporated in the film obtained in accordance with the invention.

Depending on the thickness of the films produced, the latter may be employed especially as material for closures (film of low thickness) or for packaging (film of greater thickness).

I claim:

1. Process for the manufacture of a biodegradable hydrophobic and transparent film, comprising the following steps:
   (a) producing a mixture including an alginate of algal origin, the algae being chosen from the group consisting of, chlorophyceae, rhodophyceae, or phaeophyceae, or a synthetic equivalents thereof an aqueous solvent and a plasticizer which is miscible with the alginate and the solvent;
   (b) forming a film from this mixture;
   (c) drying the film thus obtained;
   (d) treating at least one face of the dry film with a solution of tanning material selected from the group consisting of an alum, a tannin or a chrome tanning solution and then with a solution of a compound capable of ensuring the gelling of the alginate, said compound being chosen from the group consisting of calcium carbonate, calcium or zinc chloride, calcium or zinc sulfate.

2. Film obtained by carrying out the process according to claim 1.

3. Process according to claim 1, characterized in that, in stage d), the treatment of the film is performed by immersion, coating or spraying.

4. Process according to claim 1, characterized in that said solvent consists of a mixture of water and of a $C_1$–$C_6$ aliphatic monoalcohol.

5. Process according to claim 1, characterized in that the plasticizer is chosen from the group made up of polyols such as glycerol, polyethylene glycol and sorbitol.

6. Process according to claim 1, characterized in that the mixture from stage a) additionally includes additives such as antioxidants, anti-UV additives, stabilizers and colorants.

7. Process according to claim 6, characterized in that the alum is a Potassium alum.

8. Process according to claim 1, characterized in that the drying of the film is carried out by passing the latter over a series of rotary heating rollers, followed by treatment with microwaves.

9. Process according to claim 8, characterized in that the treatment with microwaves is performed by passing the film under a number of modules.

10. Process according to claim 1, characterized in that, at the end of stage a) the mixture is dehydrated and then rehydrated with a quantity of solvent which is smaller than the initial quantity.

11. Process according to claim 10, characterized in that the dehydration is carried out by freeze-drying the mixture.

12. Process according to claim 1, characterized in that the mixture from stage a) includes (% by weight):

2 to 6% of alginate;

10 to 50% of plasticizer, expressed in relation to the quantity of alginate;

the remainder being made up of the solvent.

* * * * *